(12) United States Patent
Liu et al.

(10) Patent No.: US 11,886,743 B2
(45) Date of Patent: Jan. 30, 2024

(54) METHOD FOR ENHANCING QUALITY OF SERVICE OF SOLID-STATE DRIVE AND SOLID-STATE DRIVE

(71) Applicant: SHENZHEN DAPU MICROELECTRONICS CO., LTD., Shenzhen (CN)

(72) Inventors: Yuanbing Liu, Shenzhen (CN); Xiang Chen, Shenzhen (CN); Hongbo Wan, Shenzhen (CN); Weijun Li, Shenzhen (CN); Yafei Yang, Shenzhen (CN)

(73) Assignee: SHENZHEN DAPU MICROELECTRONICS CO., LTD., Shenzhen (CN)

( * ) Notice: Subject to any disclaimer, the term of this patent is extended or adjusted under 35 U.S.C. 154(b) by 150 days.

(21) Appl. No.: 17/532,175

(22) Filed: Nov. 22, 2021

(65) Prior Publication Data
US 2022/0083275 A1 Mar. 17, 2022

Related U.S. Application Data

(63) Continuation of application No. PCT/CN2020/098672, filed on Jun. 29, 2020.

(30) Foreign Application Priority Data

Jul. 10, 2019 (CN) .......................... 201910619194.6

(51) Int. Cl.
*G06F 3/06* (2006.01)
(52) U.S. Cl.
CPC .......... *G06F 3/0659* (2013.01); *G06F 3/0613* (2013.01); *G06F 3/0679* (2013.01)
(58) Field of Classification Search
CPC .... G06F 3/0659; G06F 3/0613; G06F 3/0679; G06F 3/061; G06F 3/0611; G06F 3/0631; G06F 3/0655
See application file for complete search history.

(56) References Cited

U.S. PATENT DOCUMENTS

| 5,737,747 A | * | 4/1998 | Vishlitzky | ........... G06F 12/0866 348/E7.071 |
| 6,061,504 A | * | 5/2000 | Tzelnic | .............. H04N 21/2182 348/E7.071 |

(Continued)

FOREIGN PATENT DOCUMENTS

| CN | 103370686 A | 10/2013 |
| CN | 106227471 A | 12/2016 |

(Continued)

OTHER PUBLICATIONS

Chinese Office Action in corresponding Chinese Application No. 201910619194.6 dated Feb. 2, 2021 (8 pages).

(Continued)

*Primary Examiner* — Tasnima Matin
(74) *Attorney, Agent, or Firm* — Bayes PLLC

(57) ABSTRACT

Disclosed is a method for enhancing service quality of a solid state drive and the solid state drive, and the method includes the steps of obtaining a remaining storage resource corresponding to a write I/O request periodically, and determining a resource waiting time of the write I/O request based on a resource consumption rate of the write I/O request. The method also includes setting a maximum scheduling delay time for the write I/O request according to the resource waiting time of the write I/O request. The method also includes identifying a type of unprocessed I/O requests and obtaining an arrival time of the unprocessed I/O requests, and sorting the unprocessed I/O requests in combination with the maximum scheduling delay time. The method further includes processing the unprocessed I/O requests according to the sort of the unprocessed I/O requests.

13 Claims, 6 Drawing Sheets

(56) References Cited

U.S. PATENT DOCUMENTS

| | | | |
|---|---|---|---|
| 6,502,213 B1 * | 12/2002 | Bowman-Amuah | G06F 9/4812 710/266 |
| 6,625,750 B1 * | 9/2003 | Duso | H04L 41/0681 714/4.11 |
| 8,015,281 B2 * | 9/2011 | Baker | H04L 47/19 709/224 |
| 9,898,205 B1 * | 2/2018 | Kaliannan | G06F 3/0659 |
| 2007/0100473 A1 * | 5/2007 | Shvodian | H04L 69/28 700/19 |
| 2009/0265458 A1 * | 10/2009 | Baker | H04L 47/263 709/224 |
| 2010/0169454 A1 * | 7/2010 | Tanimura | H04L 67/62 709/217 |
| 2015/0370490 A1 * | 12/2015 | Huici | H04L 67/5682 711/103 |
| 2016/0004438 A1 * | 1/2016 | Moon | G06F 3/061 711/103 |
| 2016/0179404 A1 | 6/2016 | Nanduri et al. | |
| 2020/0073793 A1 * | 3/2020 | Saito | G06F 12/0246 |

FOREIGN PATENT DOCUMENTS

| | | |
|---|---|---|
| CN | 106598508 A | 4/2017 |
| CN | 107832009 A | 3/2018 |
| CN | 107967224 A | 4/2018 |
| CN | 109388333 A | 2/2019 |
| CN | 110362275 A | 10/2019 |
| WO | 2021004310 A1 | 1/2021 |

OTHER PUBLICATIONS

International Search Report from corresponding PCT Application No. PCT/CN2020/098672 dated Oct. 10, 2020 (2 pages).

* cited by examiner

METHOD FOR ENHANCING QUALITY OF SERVICE OF SOLID-STATE DRIVE AND SOLID-STATE DRIVE

CROSS-REFERENCE TO RELATED APPLICATIONS

The present application is a continuation of International Application No. PCT/CN2020/098672, filed on Jun. 29, 2020, which claims the benefit of priority to Chinese Patent Application No. 201910619194.6, filed on Jul. 10, 2019, both of which are incorporated herein by reference in their entireties.

TECHNICAL FIELD

The present disclosure relates to the field of data storage technology, and in particular to a method for improving the service quality of a solid state drive and the solid state drive.

BACKGROUND

SSD (solid state drive) has been widely applied to various occasions. As the performance of computers improves, the performance of solid-state drives is a key factor that affects the overall performance.

The I/O latency, the IOPS (Input/Output Operations Per Second), and the bandwidth stability are key indicators of SSD performance and affect service quality SSD. The physical devices of SSD are mainly composed of three parts: master controller, DDR, and NAND particle chip. The SSD firmware includes a front end (FE), Flash conversion layer (FTL), and back end (BE). The FE is responsible for protocol conversion of host I/O requests, the FTL is responsible for converting the logical address to the physical address of the storage space, and the BE is mainly responsible for I/O scheduling of NAND chips and protocol conversion of NAND interfaces. Due to the differences in read/write performance and features of SSD, the read I/O requests from the hosts are directly sent to the backend and to be read from the NAND. However, the write I/O requests are first written to the DDR Cache and then written to the NAND by flushing the Cache after being returned to the host.

However, due to the dielectric nature of NAND, NAND must be erased before it can be written. Therefore, in the FTL layer, there is a garbage collection function (GC) in the FTL layer, which moves data and erases invalid data to reclaim storage space for subsequent writes. To ensure the read latency of host, the system BE preferentially schedules the read I/O requests from the host, and the write I/O requests from the host are optimized by Cache. The BE scheduling mode mainly uses the fixed I/O type proportional scheduling mode. However, due to the Cache size limitation, the performance of the Cache may fluctuate greatly due to the different systems and the number of I/O request types. For example, even if the host I/O model does not change after the GC starts, the GC generates a large number of background read I/O requests, write I/O requests, and erase I/O requests. As a result, the read/write performance of the host deteriorates and the/O performance indicators fluctuate greatly. All these factors will lead to a significant decline in service quality performance indicators.

SUMMARY OF THE DISCLOSURE

The disclosure provides a method for improving the service quality of a solid state drive and the solid state drive, which are used for solving the problem that the read-write performance of a host is reduced to cause large fluctuation of I/O performance indexes when the data of different I/O types of the existing solid state drive is rapidly increased.

In order to solve the above problem, the present disclosure provides a method for improving the service quality of a solid state drive, including obtaining the remaining storage resources corresponding to the write I/O request periodically, and determining the resource waiting time of the write I/O request based on the resource consumption rate of the write I/O request; setting the maximum scheduling delay time for the write I/O request according to the resource waiting time for the write I/O request; identifying the type of unprocessed I/O requests and obtaining the arrival time of the unprocessed I/O requests, and sorting the unprocessed I/O requests in combination with the maximum scheduling delay time; processing the unprocessed I/O requests according to the sort of the unprocessed I/O requests.

In some embodiments, the unprocessed I/O request includes read I/O request, write I/O request, and/or erase I/O request.

In some embodiments, the remaining storage resources are the current Cache water level, and the resource consumption rate is the bandwidth of the current write I/O request.

In some embodiments, the step of setting the maximum scheduling delay time for the write I/O request according to the resource waiting time for the write I/O request further including: setting the maximum scheduling delay time for the write I/O request according to the preset Cache water level warning threshold and the resource waiting time of the write I/O request.

In some embodiments, the step of identifying the type of unprocessed I/O requests and obtaining the arrival time of the unprocessed I/O requests, and sorting the unprocessed I/O requests in combination with the maximum scheduling delay time further including: obtaining the arrival time of each read I/O request, each write I/O request, and/or each erase I/O request respectively; adjusting the order between the read I/O requests, the write I/O requests, and/or the erase I/O requests according to the arrival time and the maximum scheduling delay time.

In order to solve the above problem, the present disclosure further provides a solid state drive, including: a memory and a processor, wherein the processor is coupled with the memory, and a computer program capable of running on the processor is stored in the memory, wherein the processor implements the steps of the method for improving the quality of service of the solid state drive according to any one of the above methods when executing the computer program.

In order to solve the above problem, the present disclosure further provides a method for improving the service quality of a solid state drive, including: acquiring free space of the solid state drive periodically, and determining the maximum scheduling delay time of erase I/O request through the free space; identifying the type of the unprocessed I/O request, and acquiring the arrival time of the unprocessed I/O request, and sorting the unprocessed I/O request by combining the maximum scheduling delay time; processing the unprocessed I/O requests according to to the sort of the unprocessed I/O requests.

In some embodiments, the unprocessed I/O request includes read I/O request, write I/O request, and/or erase I/O request.

In some embodiments, the step of identifying the type of the unprocessed I/O request, and acquiring the arrival time of the unprocessed I/O request, and sorting the unprocessed I/O request by combining the maximum scheduling delay time further including: obtaining the arrival time of each read I/O request, each write I/O request, and/or each erase I/O request respectively; adjusting the order between the read I/O requests, the write I/O requests, and/or the erase I/O requests according to the arrival time and the maximum scheduling delay time.

In order to solve the above problem, the present disclosure further provides a solid state drive, including: a memory and a processor, wherein the processor is coupled with the memory, and a computer program capable of running on the processor is stored in the memory, wherein the processor implements the steps of the method for improving the quality of service of the solid state drive according to any one of the above methods when executing the computer program.

Compared with the prior art, the disclosure obtaining the remaining storage resources corresponding to the write I/O request and the resource consumption rate periodically, then calculating the resource waiting time of the write I/O request, and setting the maximum scheduling delay time of the write I/O request according to the resource waiting time. Combined with the arrival time of unprocessed I/O requests and the maximum scheduling delay time of write I/O requests, all unprocessed I/O requests are sorted and processed in sequence. The periodic setting dynamically allocates the remaining storage resources for write I/O requests. In this way, when I/O requests surge, the performance of SSDS varies greatly due to improper storage resource allocation, which improves the SSD service quality.

BRIEF DESCRIPTION OF THE DRAWINGS

In order to more clearly illustrate the technical scheme of embodiments of the disclosure, a brief description of the drawings required in the embodiments is given below. It is to be understood that the following appended drawings show only certain embodiments of the present disclosure and, therefore, should not be regarded as a limitation of scope. For ordinary technicians in this field, other related drawings can be obtained according to these drawings without any creative effort.

DETAILED DESCRIPTION

The technical solutions in the embodiments of the present disclosure are clearly and completely described in the following with reference to the accompanying drawings in the embodiments of the present disclosure. It is obvious that the described embodiments are only a part of the embodiments of the present disclosure, but not all embodiments. All other embodiments obtained by a person skilled in the art based on the embodiments of the present disclosure without creative efforts are within the scope of the present disclosure.

Figure 1:
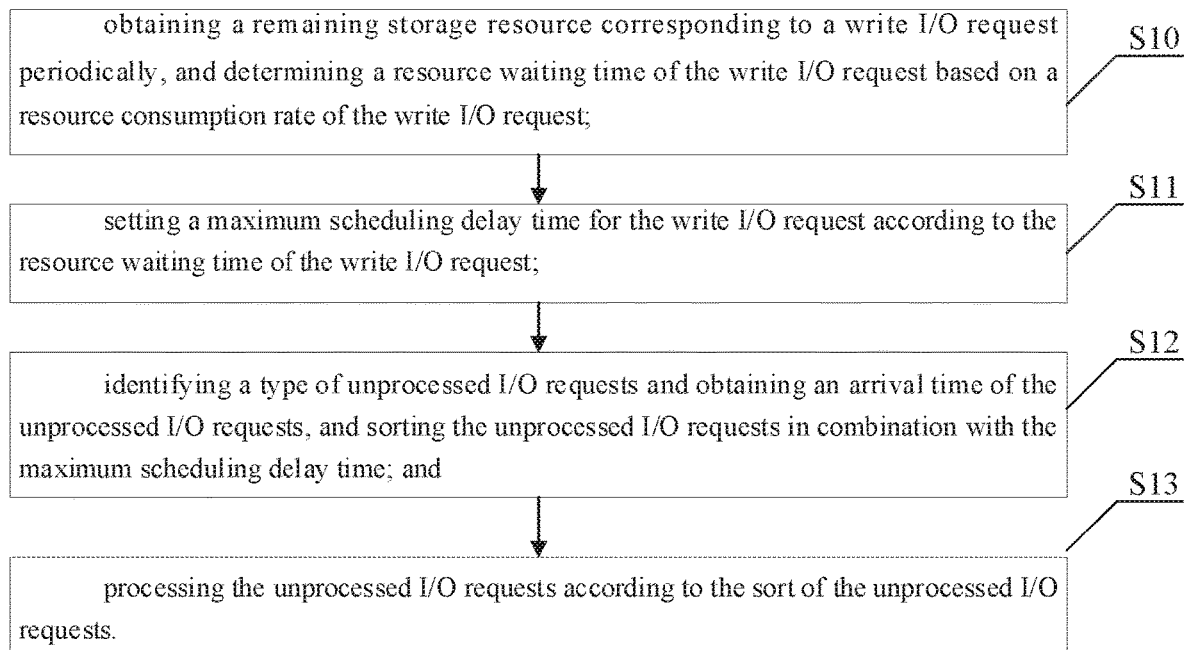
FIG. 1 shows the flow diagram of the first embodiment of the method of improving SSD service quality of the disclosure.
Figure 2:
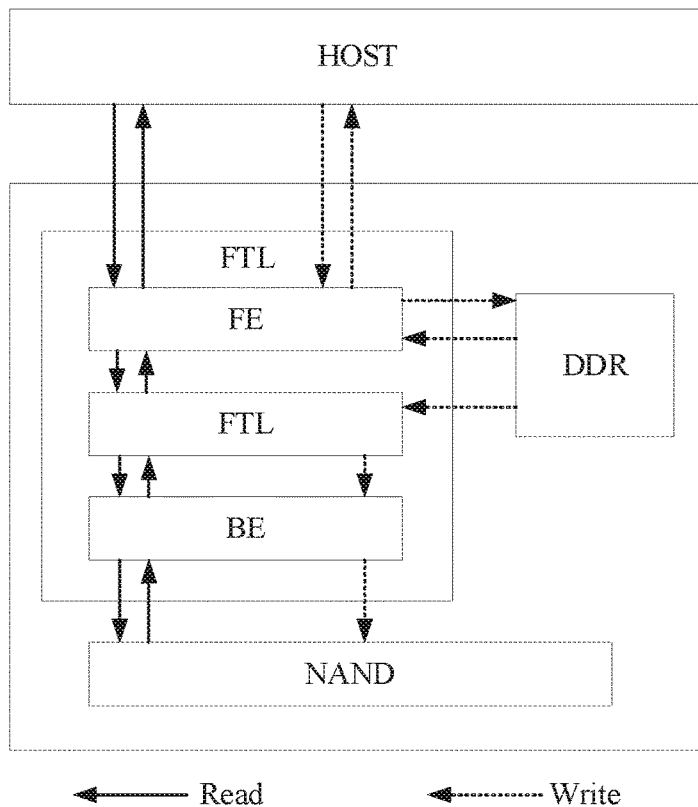
FIG. 2 shows the structure diagram of SSD handling the read/write I/O requests of the disclosure.

Please refer to FIG. 1, which shows the flow diagram of the first embodiment of the method of improving SSD service quality of the disclosure. In this embodiment, the method of improving SSD service quality is applied to SSDS. Typically, in SSDS, when an/O request is received, storage resources need to be allocated to handle the request. For example, using read/write I/O requests as an example, as shown in FIG. 2, the firmware of SSD typically includes a front end (FE), a Flash conversion layer (FTL), and a back end (BE). After receiving the read I/O request from the host (as shown by the solid arrow in the FIG. 2), the read I/O request is directly sent from the front end to the back end, and then read from the NAND and sent back to the host. However, for the write I/O request (as shown by the dotted arrow in the FIG. 2), the front-end writes the content to the DDR and returns it to the host. The contents of write I/O requests are then written to NAND by Cache flushing (DDR). Thus, the main factor affecting write performance is the size of the DDR (that is, the size of the cache). However, when the DDR storage space is occupied, the write performance of the SSD deteriorates and the write performance of the SSD fluctuates greatly. Therefore, to improve SSD service quality, it needs to avoid improper storage resource allocation. As shown in FIG. 1, the method of improving SSD service quality in the embodiment of the present disclosure includes the following steps.

Step S10: obtaining the remaining storage resources corresponding to the write I/O request periodically, and determining the resource waiting time of the write I/O request based on the resource consumption rate of the write I/O request.

Note that the period for obtaining the remaining storage resources corresponding to write I/O requests is preset. Typically, the factor that affects write I/O request processing performance is Cache size. In this example, the remaining storage resources are the current Cache watermark, and the resource consumption rate is the bandwidth of the current write I/O request.

Specifically, calculating the waiting time of the write I/O request based on the resource consumption rate of the write I/O request after obtaining the remaining storage resources corresponding to the write I/O request type. For example, if the Cache size is 10 MB and the write I/O request bandwidth is 500 MB/s, the Cache resource waiting time can be calculated as: Resource waiting time=Cache size/(write I/O request bandwidth)=20 ms; that is, when the Cache water level is 0, the Cache resource waiting time is 20 ms. Furthermore, periodic fetching allows this embodiment to periodically determine the resource elapsed time for writing I/O requests.

Step S11: setting the maximum scheduling delay time for the write I/O request according to the resource waiting time for the write I/O request.

Calculating the resource waiting time for write I/O requests, and then setting the maximum delay for scheduling write I/O requests based on the resource waiting time. In general, to prevent high Cache water level from affecting the read/write performance of the SSD, the step S11 further includes: setting the maximum scheduling delay time for the write I/O request according to the preset Cache water level warning threshold and the resource waiting time of the write I/O request.

Specifically, the preset Cache water level threshold is usually set to 80% of the Cache level. When the Cache water level reaches 80%, it indicates that the Cache water level enters the warning level. Generally, keeping the Cache water level below the preset Cache water level threshold can ensure that the performance of write I/O requests on SSDS is not affected. Therefore, for the write I/O requests, the maximum latency of the write I/O requests can be set based on the Cache watermark warning threshold and the resource waiting time of the write I/O requests. For example, if the Cache resource waiting time is 20 ms and the preset Cache watermark threshold is 80%, the maximum delay is 16 ms.

Step S12: identifying the type of unprocessed I/O requests and obtaining the arrival time of the unprocessed I/O requests, and sorting the unprocessed I/O requests in combination with the maximum scheduling delay time.

It should be noted that in this embodiment, the unprocessed I/O request includes read I/O request, write I/O request, and/or erase I/O request.

Specifically, after all outstanding I/O requests have been identified, the arrival time of each outstanding I/O request is obtained. All the unprocessed I/O requests are then sorted in combination with the obtained arrival time and maximum scheduling delay time.

Figure 3:
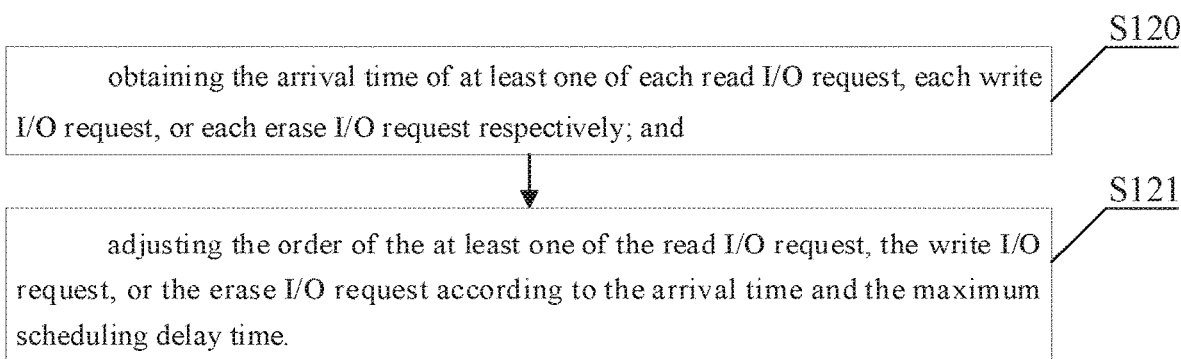
FIG. 3 is a flow diagram of a second embodiment of the method for improving SSD service quality of the disclosure.

Furthermore, the latency of read I/O requests is much smaller than that of write I/O requests and erase I/O requests. Therefore, the system needs to prioritize the read I/O requests as much as possible to improve the overall SSD performance. Therefore, on the basis of the above embodiments, among other embodiments, as shown in FIG. 3, the Step S12 further includes: Step S120: obtaining the arrival time of each read I/O request, each write I/O request, and/or each erase I/O request respectively; and Step S121: adjusting the order between the read I/O requests, the write I/O requests, and/or the erase I/O requests according to the arrival time and the maximum scheduling delay time.

It should be noted that the scheduling time is determined by the sum of the arrival time of unprocessed I/O and the maximum delay scheduling time. Then, the scheduling sort of all unprocessed I/O is determined by time sequence.

Figure 4:
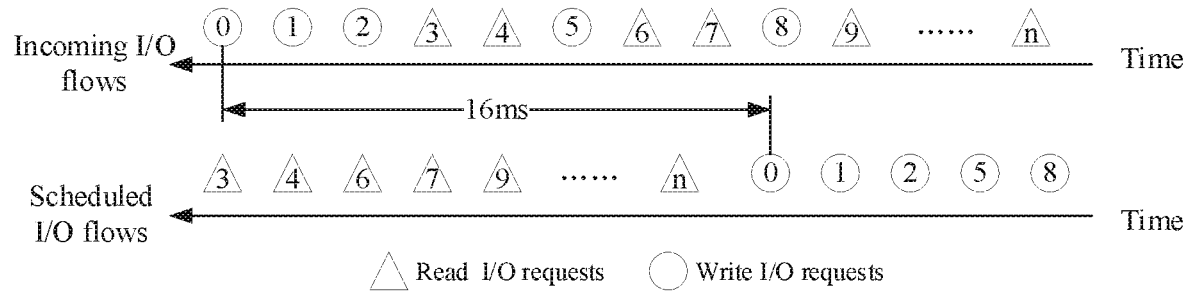
FIG. 4 shows the scheduling diagram of the read I/O request and write I/O request sorting of the disclosure.

Preferably, after obtaining the arrival time of all unprocessed I/O requests, the unprocessed I/O requests are sorted according to the arrival time and the maximum scheduling delay time for write I/O requests. Wherein, the read I/O requests are prioritized within the maximum scheduling delay time. For example, if the current Cache water level is 0 and the maximum scheduling delay is 16 ms, sorting the unprocessed I/O requests as shown in FIG. 4. Ensure that read I/O requests are prioritized within the maximum scheduling delay time to improve SSD performance.

Step S13: processing the unprocessed I/O requests according to the sort of the unprocessed I/O requests.

In this example, the disclosure discloses obtaining the remaining storage resources corresponding to the write I/O request and the resource consumption rate periodically, then calculating the resource waiting time of the write I/O request, and setting the maximum scheduling delay time of the write I/O request according to the resource waiting time. Combined with the arrival time of unprocessed I/O requests and the maximum scheduling delay time of write I/O requests, all unprocessed I/O requests are sorted and processed in sequence. The periodic setting dynamically allocates the remaining storage resources for write I/O requests. In this way, when I/O requests surge, the performance of SSDS varies greatly due to improper storage resource allocation, which improves the SSD service quality.

Furthermore, in some embodiments, the change of the remaining storage resources can be detected in real time. When the remaining storage resources change greatly, the system dynamically adjusts the processing sort of the unprocessed I/O requests based on the remaining storage resources, which can avoid that SSD performance fluctuations caused by storage resources being used up.

Figure 5:
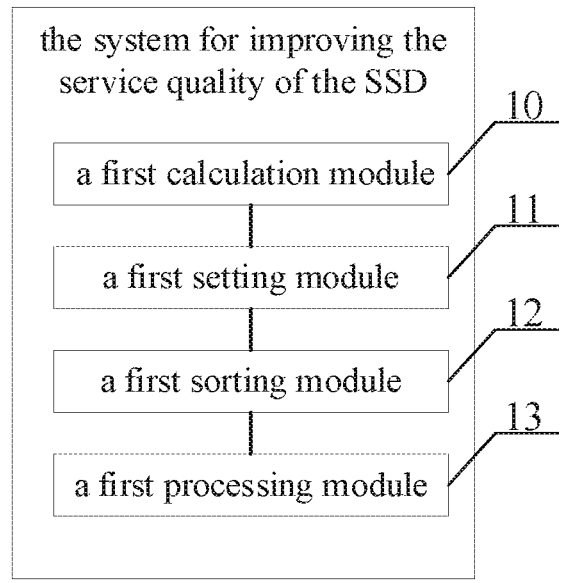
FIG. 5 shows the schematic diagram of the functional module of the first embodiment of the system for improving the service quality of the SSD of the disclosure.

FIG. 5 shows the schematic diagram of the functional module of the first embodiment of the system for improving the service quality of the SSD of the disclosure. As show in FIG. 5, in this embodiment, the SSD includes a first calculation module 10, a first setting module 11, a first sorting module 12, and a first processing module 13.

Wherein, the first computing module 10 is used to periodically obtain the remaining storage resources corresponding to the write I/O requests and determine the resource waiting time of the write I/O requests based on the resource consumption rate of the write I/O requests. The first setting module 11 is used to set the maximum scheduling delay of the write I/O requests according to the resource waiting time of write I/O requests. The first sorting module 12 is used to identify the type of the unprocessed I/O requests, obtain the arrival time of the unprocessed I/O requests, and sort the unprocessed I/O requests based on the maximum scheduling delay time. The first processing module 13 is used to process the unprocessed I/O requests based on the ordering of the unprocessed I/O requests.

Based on the above embodiments, in other embodiments, the unprocessed I/O request includes read I/O request, write I/O request, and/or erase I/O request.

Based on the above embodiments, in other embodiments, the remaining storage resources are the current Cache water level, and the resource consumption rate is the bandwidth of the current write I/O request.

Based on the above embodiments, in other embodiments, the first setting module 11 set the maximum scheduling delay of the write I/O requests according to the resource waiting time of write I/O requests further includes setting the maximum scheduling delay time for the write I/O request according to the preset Cache water level warning threshold and the resource waiting time of the write I/O request.

Based on the above embodiments, in other embodiments, the first sorting module 12 is configured to identify the type of the unprocessed I/O requests, obtain the arrival time of the unprocessed I/O requests, and sort the unprocessed I/O requests based on the maximum scheduling delay time, and is further configured to obtain the arrival time of each read I/O request, each write I/O request, and/or each erase I/O request respectively; and adjust the order between the read I/O requests, the write I/O requests, and/or the erase I/O requests according to the arrival time and the maximum scheduling delay time.

For other details about the technical solution for each module of the system to improve SSD service quality in the above embodiments, please also refer to the description of the methods for improving SSD service quality in the above embodiments.

It should be noted that all embodiments in this manual are described in a progressive manner, and each embodiment focuses on the differences with other embodiments. The same and similar parts of each embodiment can be referred to each other. As for device embodiments, they are basically similar to method embodiments, so the description is relatively simple. For relevant points, please refer to part of method embodiments.

Figure 6:
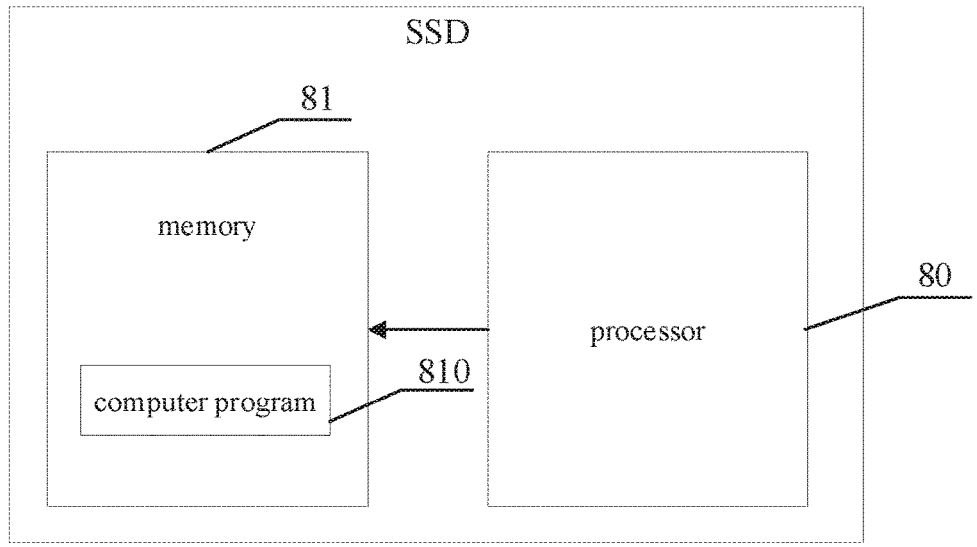
FIG. 6 shows the frame structure diagram of the first embodiment of the SSD of the disclosure.

FIG. 6 shows the frame structure diagram of the first embodiment of the SSD of the disclosure. Refer to the FIG. 6, in this embodiments, the SSD includes one or at least two processors 80, memory 81, and a computer program 810 stored in memory 81 that can run on processor 80. The processor 80 executes the computer program 810 to implement the steps in the method of improving the quality of service of the SSD, for example: Step S10 step S13 as shown in the FIG. 1. Alternatively, the processor 80 performs the functions of the modules/units in the above system embodiment for improving SSD service quality when executing the computer program 810, for example: the FIG. 5 shows the functions of the first computing module 10 and the first processing module 13.

The computer program 810 can be divided into one or more modules/units, and the one or more modules/units are stored in memory 81 and executed by processor 80 to complete this disclosure. The one or more modules/units can be a series of computer program instruction segments capable for performing a specific function which used to describe the execution of computer program 810 in SSD.

The SSD includes but is not limited to a processor 80 and a memory 81. Those skilled in the field can understand that the FIG. 6 is only an example of an SSD and does not constitute a qualification of an SSD. It may include more or fewer parts than shown in FIG. 6, or a combination of parts, or different parts.

The processor 80 can be a central processing unit (CPU), other general-purpose processors, a digital signal processor (DSP), an application specific integrated circuit (ASIC), field-programmable gate array (FPGA) or other programmable logic devices, discrete gates or transistor logic devices, discrete hardware components, etc. The general-purpose processor can be a microprocessor or the processor can be any general processor, etc.

The memory 81 may be a read-only memory, an SSD capable of storing static information and instructions, a random access memory, or a dynamic SSD capable of storing information and instructions, and may also be an electrically erasable programmable read-only memory, a read-only optical disk, or other optical disk storage, magnetic disk storage media, or other magnetic SSD. The memory 81 may be connected to the processor 80 via a communication bus or may be integrated with the processor 80.

In the above embodiments, the descriptions of the respective embodiments have respective emphasis, and reference may be made to the related descriptions of other embodiments for parts that are not described or illustrated in a certain embodiment.

Those of ordinary skill in the art will appreciate that the various illustrative elements and algorithm steps described in connection with the embodiments disclosed herein may be implemented as electronic hardware or combinations of computer software and electronic hardware. Whether such functionality is implemented as hardware or software depends upon the particular application and design constraints imposed on the implementation. Skilled artisans may implement the described functionality in varying ways for each particular application, but such implementation decisions should not be interpreted as causing a departure from the scope of the present disclosure.

In the embodiments provided in the present disclosure, it should be understood that the disclosed system and method may be implemented in other ways. For example, the above-described system embodiments are merely illustrative, and for example, a module or a unit may be divided into only one logical function, and may be implemented in other ways, for example, multiple units or components may be combined or integrated into another system, or some features may be omitted, or not executed. In addition, the shown or discussed mutual coupling or direct coupling or communication connection may be an indirect coupling or communication connection through some interfaces, devices or units, and may be in an electrical, mechanical or other form.

In addition, functional units in the embodiments of the present disclosure may be integrated into one processing unit, or each unit may exist alone physically, or two or more units are integrated into one unit. The integrated unit can be realized in a form of hardware, and can also be realized in a form of a software functional unit.

The disclosure embodiments also provide a storage medium for storing computer programs which contains program data designed to perform the method for improving the quality of SSD service described in this disclosure in this embodiments. The methods provided in this disclosure for improving the quality of SSD service can be implemented by executing the computer programs stored in the storage medium.

If the integrated module/unit is implemented as software functional units and sold or used as stand-alone products, they can be stored in a computer readable storage medium. Based on this understanding, this disclosure implements all or part of the above embodiments method by means of hardware associated with the instructions of computer program 810. Wherein, the computer program 810 includes computer program code, which can be in the form of source code, object code, executable file or some intermediate form, etc. The computer readable media may include: any entity or device that can carry computer program code, recording media, U disk, mobile hard disk, disk, optical disk, computer memory, read-only memory (ROM), random access Memory (RAM), electric carrier signal, telecom signal and software distribution media, etc. It should be noted that the contents contained in computer-readable media may be appropriately added or subtracted according to the requirements of legislation and patent practice in the jurisdiction. For example, in some jurisdictions, by legislative and patent practice, computer-readable media do not include electrical carrier signals and telecommunications signals.

Figure 7:
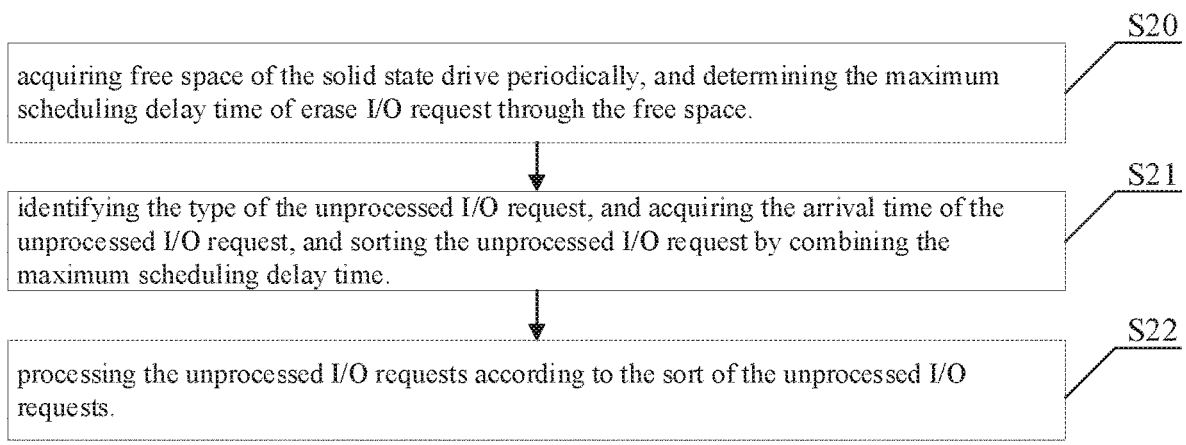
FIG. 7 shows the flow diagram of the third embodiment of the method of improving SSD service quality of the disclosure.

FIG. 7 shows the flow diagram of the third embodiment of the method of improving SSD service quality of the disclosure. As shown in FIG. 7, the methods to improve SSD service quality further includes:

Step S20: acquiring free space of the solid state drive periodically, and determining the maximum scheduling delay time of erase I/O request through the free space.

It should be noted that the free space of the SSD in this embodiment refers to a remaining storage space of the SSD when the erase I/O request is processed, that is, the free physical blocks in the SSD, and the period for obtaining the free space of the SSD is preset. It can be understood that when the SSD has a large amount of free space, the processing of the erase I/O request can be delayed, and therefore, the maximum scheduling delay time of the erase I/O request is relatively longer; on the contrary, when the SSD has less free space, the processing of the erase I/O request is preferentially performed to leave free space for other data to be written, and at this time, the maximum scheduling delay time of the erase I/O request is relatively short.

Specifically, after the free space of the SSD is obtained, the resource waiting time corresponding to the erase I/O request is calculated based on the resource consumption rate of the erase I/O request to determine the maximum scheduling delay time of the erase I/O request. Also, the periodic acquisition allows the present embodiment to periodically determine the maximum scheduled delay time of the erase I/O request.

Further, a minimum free space threshold may be set, when the minimum free space threshold is reached, the erasing is started, and the maximum scheduling delay time of the erase I/O request can be determined according to the minimum free space threshold.

Step S21: identifying the type of the unprocessed I/O request, and acquiring the arrival time of the unprocessed I/O request, and sorting the unprocessed I/O request by combining the maximum scheduling delay time.

It should be noted that, in the present embodiment, the unprocessed I/O requests include read I/O requests, erase I/O requests, and/or write I/O requests.

Specifically, after all the unprocessed I/O requests are identified, the arrival time of each unprocessed I/O request is obtained, and then all the unprocessed I/O requests are sorted by combining the arrival time and the maximum scheduling delay time.

Figure 8:
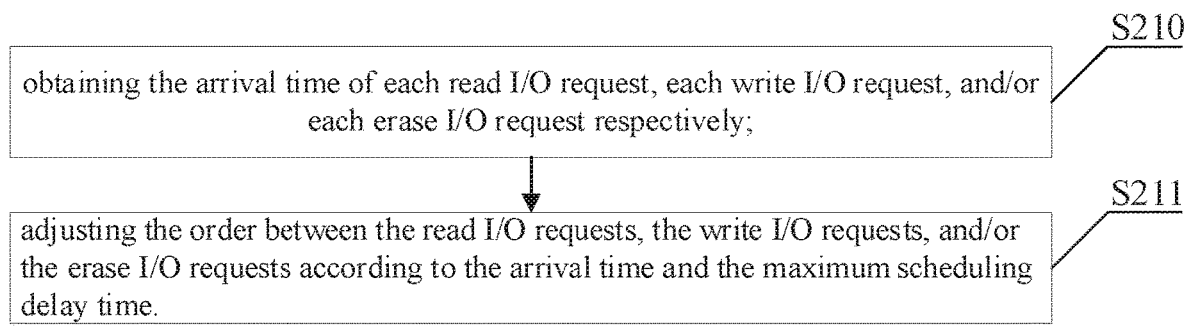
FIG. 8 shows the flow diagram of the fourth embodiment of the method of improving SSD service quality of the disclosure.

Further, in general, the latency time of the read I/O request is much smaller than the latency time of the erase I/O request and the write I/O request, and the system needs to schedule the read I/O request as preferentially as possible to improve the overall performance of the SSD, so that when the unprocessed I/O request is the read I/O request, in another embodiment, as shown in FIG. 8, the step S21 further includes: Step S210: obtaining the arrival time of each read I/O request, each write I/O request, and/or each erase I/O request respectively; and Step S211: adjusting the order between the read I/O requests, the write I/O requests, and/or the erase I/O requests according to the arrival time and the maximum scheduling delay time.

It should be noted that the scheduling time is determined according to the sum of the arrival time of the unprocessed I/O and the maximum delay scheduling time, and the scheduling sort of all the unprocessed I/O is determined by uniformly sorting according to time sequence.

Preferably, after the arrival time of all the unprocessed I/O requests is obtained, the unprocessed I/O requests are sorted according to the arrival time and the maximum scheduling delay time of the erase I/O request; wherein the read I/O requests are preferentially sorted within the maximum scheduling delay time to ensure the performance of the SSD.

Step S22: processing the unprocessed I/O requests according to the sort of the unprocessed I/O requests.

In the embodiment, the free space corresponding to the erase I/O request is periodically acquired, so that the maximum scheduling delay time of the erase I/O request is calculated, all unprocessed I/O requests are sequenced by combining the arrival time of the unprocessed I/O requests and the maximum scheduling delay time of the erase I/O requests, and the unprocessed I/O requests are processed in sequence, wherein the free space corresponding to the erase I/O requests can be dynamically allocated by periodic setting, the problem that the overall performance of the SSD is greatly fluctuated due to unreasonable allocation of the free space corresponding to the erase I/O requests when the I/O requests are increased rapidly is solved, and the service quality of the SSD is improved.

Furthermore, in some embodiments, the change condition of the free space corresponding to the erase I/O request can be detected in real time, and when the free space changes to a large extent, the processing sort of the unprocessed I/O request is dynamically adjusted in time according to the free space, so as to avoid that the performance of the SSD fluctuates greatly when the storage resource is used up.

Figure 9:
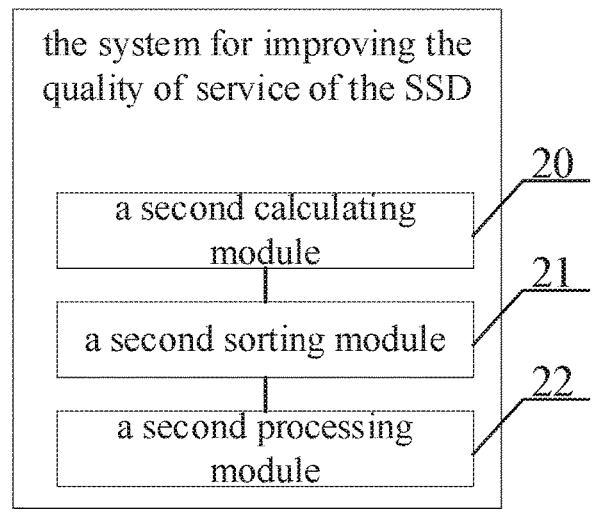
FIG. 9 shows the schematic diagram of the functional module of the second embodiment of the system for improving the service quality of the SSD of the disclosure.

FIG. 9 shows the schematic diagram of the functional module of the second embodiment of the system for improving the service quality of the SSD of the disclosure. As shown in FIG. 9, in this embodiment, the system for improving the quality of service of the SSD includes a second calculating module 20, a second sorting module 21, and a second processing module 22.

The second calculation module 20 is configured to periodically obtain the free space of the SSD, and determine the maximum scheduling delay time of the erase request through the free space; a second sorting module 21, is configured to identify the type of the unprocessed I/O requests, and obtain the arrival time of the unprocessed I/O request, and sort the unprocessed I/O request based on the maximum scheduling delay time; a second processing module 22, is configured to process the unprocessed I/O requests according to the ordering of the unprocessed I/O requests.

Based on the above embodiments, in other embodiments, the unprocessed I/O requests include read I/O requests, erase I/O requests, and/or write I/O requests.

On the basis of the foregoing embodiment, in other embodiments, the second sorting module 21 identifying the type of unprocessed I/O requests and obtaining the arrival time of the unprocessed I/O requests, and sorting the unprocessed I/O requests in combination with the maximum scheduling delay time further includes: obtaining the arrival time of each read I/O request, each write I/O request, and/or each erase I/O request respectively; and adjusting the order between the read I/O requests, the write I/O requests, and/or the erase I/O requests according to the arrival time and the maximum scheduling delay time.

For other details of the technical solution for implementing each module of the system for improving the service quality of the solid state drive in the foregoing embodiment, reference may be made to the description of the method for improving the service quality of the solid state drive in the foregoing embodiment, and details are not described here again.

It should be noted that, in the present specification, the embodiments are all described in a progressive manner, each embodiment focuses on differences from other embodiments, and the same and similar parts among the embodiments may be referred to each other. For the device-like embodiment, since it is basically similar to the method embodiment, the description is simple, and for the relevant points, reference may be made to the partial description of the method embodiment.

Figure 10:
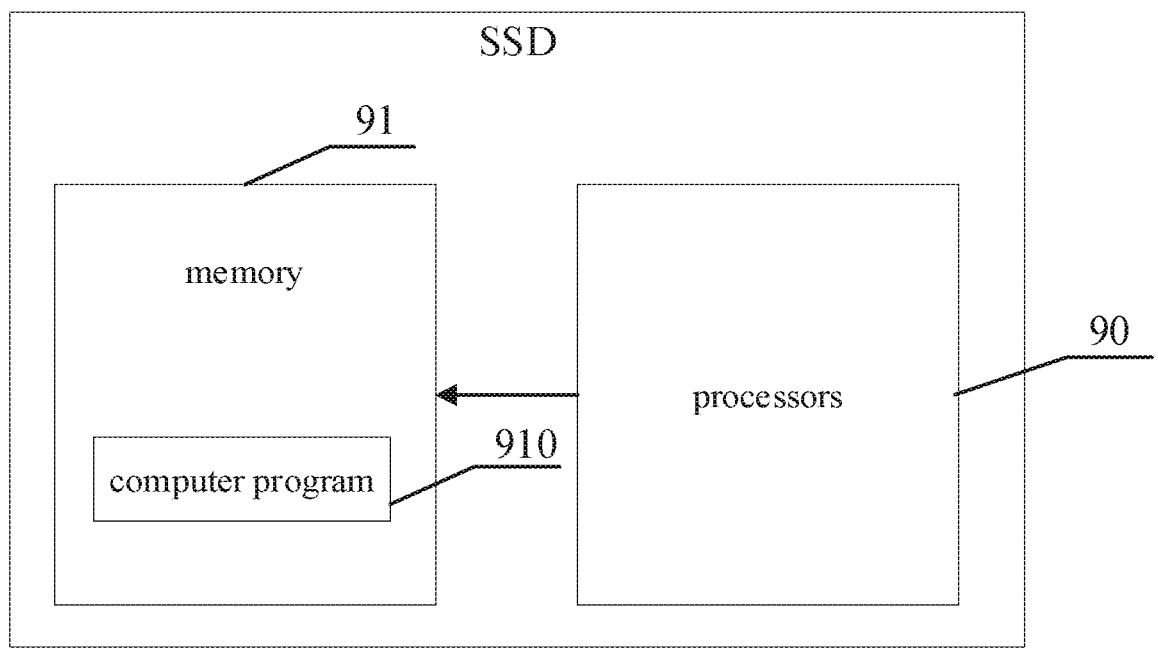
FIG. 10 shows a frame structure diagram of the second embodiment of the present disclosure.

FIG. 10 shows a frame structure diagram of the second embodiment of the present disclosure. Referring to FIG. 10, the SSD in this embodiment includes one or at least two processors 90, a memory 91 and a computer program 910 stored in the memory 91 and executable on the processors 90. When the processor 90 executes the computer program 910, the steps in the method for improving the quality of service of the SSD described in the foregoing embodiments are implemented, such as the step S20—the step S22 shown in FIG. 7. Alternatively, when the processor 90 executes the computer program 910, the functions of the modules/units in the above system embodiment for improving the quality of service of the solid state drive are implemented; such as the functionality of the modules 20-22 shown in FIG. 9.

The computer program 910 can be divided into one or more modules/units, which are stored in the memory 91 and executed by the processor 90 to accomplish the present disclosure. The one or more modules/units may be a series of computer program instruction segments capable of performing specific functions, the instruction segments describes the execution process of the computer program 910 in the SSD.

The SSD includes, but is not limited to, a processor 90 and a memory 91. Those skilled in the art will appreciate that FIG. 10 is merely an example of an SSD and is not intended to be limiting and may include more or fewer components than those shown, or some components may be combined, or different components.

The Processor 90 can be a central processing unit (CPU), other general-purpose processors, a digital signal processor (DSP), an application specific integrated circuit (ASIC), field-programmable gate array (FPGA) or other programmable logic devices, discrete gates or transistor logic devices, discrete hardware components, etc. The general-purpose processor can be a microprocessor or the processor can be any general processor, etc.

The memory 91 may be a read-only memory, an SSD capable of storing static information and instructions, a random access memory, or a dynamic SSD capable of storing information and instructions, and may also be an electrically erasable programmable read-only memory, a read-only optical disk, or other optical disk storage, magnetic disk storage media, or other magnetic SSD. The memory 91 may be connected to the processor 90 via a communication bus or may be integrated with the processor 90.

In the above embodiments, the descriptions of the respective embodiments have respective emphasis, and reference may be made to the related descriptions of other embodiments for parts that are not described or illustrated in a certain embodiment.

Those of ordinary skill in the art will appreciate that the various illustrative elements and algorithm steps described in connection with the embodiments disclosed herein may be implemented as electronic hardware or combinations of computer software and electronic hardware. Whether such functionality is implemented as hardware or software depends upon the particular application and design constraints imposed on the implementation. Skilled artisans may implement the described functionality in varying ways for each particular application, but such implementation decisions should not be interpreted as causing a departure from the scope of the present disclosure.

In the embodiments provided in the present disclosure, it should be understood that the disclosed system and method may be implemented in other ways. For example, the above-described system embodiments are merely illustrative, and for example, a module or a unit may be divided into only one logical function, and may be implemented in other ways, for example, multiple units or components may be combined or integrated into another system, or some features may be omitted, or not executed. In addition, the shown or discussed mutual coupling or direct coupling or communication connection may be an indirect coupling or communication connection through some interfaces, devices or units, and may be in an electrical, mechanical or other form.

In addition, functional units in the embodiments of the present disclosure may be integrated into one processing unit, or each unit may exist alone physically, or two or more units are integrated into one unit. The integrated unit can be realized in a form of hardware, and can also be realized in a form of a software functional unit.

The embodiment of the present disclosure further provides a storage medium, configured to store the computer program, where the storage medium includes the program data designed to execute the method for improving the quality of service of the SSD according to the embodiment of the present disclosure. By executing the computer program stored in the storage medium, the method for improving the service quality of the SSD provided by the disclosure can be realized.

The integrated modules/units, if implemented in the form of software functional units and sold or used as stand-alone products, can be stored in a computer readable storage medium. Based on such understanding, all or part of the processes in the methods of the embodiments described above can be implemented by the computer program 910, the computer program 910 can be stored in a computer-readable storage medium, and the steps of the methods described above can be implemented by the computer program 910 when the computer program 910 is executed by the processor 90. Wherein, the computer program 910 includes, among other things, computer program code, which may be in the form of source code, object code, an executable file or some intermediate form. The computer readable medium may include: any entity or device capable of carrying computer program code, recording medium, U.S. disk, removable hard disk, magnetic disk, optical disk, computer Memory, Read-Only Memory (ROM), Random Access Memory (RAM), electrical carrier wave signals, telecommunications signals, software distribution media, and the like. It should be noted that the computer readable medium may include any suitable increase or decrease as required by legislation and patent practice in the jurisdiction, for example, in some jurisdictions, computer readable media may not include electrical carrier signals and telecommunications signals in accordance with legislation and patent practice.

The above embodiments are only used to illustrate the technical solutions of the present disclosure, and are not intended to be limiting; although the present disclosure has been described in detail with reference to the foregoing embodiments, those of ordinary skill in the art should understand that the technical solutions are described as being modified, or equivalent to some of the technical features, and the modifications and substitutions do not depart from the spirit and scope of the technical solutions of the embodiments of the present disclosure.

What is claimed is:

1. A method for enhancing service quality of a solid state drive, comprising:
   obtaining a remaining storage resource corresponding to a write I/O request periodically, and determining a resource waiting time of the write I/O request based on a resource consumption rate of the write I/O request;
   setting a maximum scheduling delay time for the write I/O request according to the resource waiting time of the write I/O request;
   identifying one or more types of a set of unprocessed I/O requests, obtaining a set of arrival times associated with the set of unprocessed I/O requests, and sorting adjusting an order of the set of unprocessed I/O requests based on the set of arrival times and the maximum scheduling delay time; and processing the set of unprocessed I/O requests according to the order of the set of unprocessed I/O requests.

2. The method of claim 1, wherein the set of unprocessed I/O requests comprise at least one of a read I/O request, the write I/O request, or an erase I/O request.

3. The method of claim 1, wherein the remaining storage resource is a current Cache water level, and the resource consumption rate is a bandwidth of a current write I/O request.

4. The method of claim 3, wherein setting the maximum scheduling delay time for the write I/O request according to the resource waiting time of the write I/O request further comprises:

setting the maximum scheduling delay time for the write I/O request according to a preset Cache water level warning threshold and the resource waiting time of the write I/O request.

5. The method of claim 2, wherein the step of identifying the one or more types of the set of unprocessed I/O requests, obtaining the set of arrival times associated with the set of unprocessed I/O requests, and adjusting the order of the set of unprocessed I/O requests based on the set of arrival times and the maximum scheduling delay time further comprises:

obtaining at least one arrival time of at least one of the read I/O request, the write I/O request, or the erase I/O request; and adjusting an order of the at least one of the read I/O request, the write I/O request, or the erase I/O request according to the at least one arrival time and the maximum scheduling delay time.

6. A solid state drive, comprising a memory and a processor, wherein the processor is coupled with the memory, and a computer program capable of running on the processor is stored in the memory, wherein when executing the computer program, the processor implements a method for enhancing service quality of the solid state drive, the method comprising:

obtaining a remaining storage resource corresponding to a write I/O request periodically, and determining a resource waiting time of the write I/O request based on a resource consumption rate of the write I/O request;

setting a maximum scheduling delay time for the write I/O request according to the resource waiting time of the write I/O request;

identifying a one or more types of a set of unprocessed I/O requests, obtaining a set of arrival times associated with the set of unprocessed I/O requests, and adjusting an order of the set of unprocessed I/O requests based on the set of arrival times and the maximum scheduling delay time; and processing the set of unprocessed I/O requests according to the order of the set of unprocessed I/O requests.

7. The solid state drive of claim 6, wherein the set of unprocessed I/O requests comprise at least one of a read I/O request, the write I/O request, or an erase I/O request.

8. The solid state drive of claim 6, wherein the remaining storage resource is a current Cache water level, and the resource consumption rate is a bandwidth of a current write I/O request.

9. The solid state drive of claim 8, wherein setting the maximum scheduling delay time for the write I/O request according to the resource waiting time of the write I/O request further comprises:

setting the maximum scheduling delay time for the write I/O request according to a preset Cache water level warning threshold and the resource waiting time of the write I/O request.

10. The solid state drive of claim 7, wherein identifying the one or more types of the set of unprocessed I/O requests, obtaining the set of arrival times associated with the set of unprocessed I/O requests, and adjusting the order of the set of unprocessed I/O requests based on the set of arrival times and the maximum scheduling delay time further comprises:

obtaining at least one arrival time of at least one of the read I/O request, the write I/O request, or the erase I/O request; and adjusting an order of the at least one of the read I/O request, the write I/O request, or the erase I/O request according to the at least one arrival time and the maximum scheduling delay time.

11. A method for enhancing service quality of a solid state drive, comprising:

acquiring free space of the solid state drive periodically, and determining a maximum scheduling delay time of an erase I/O request through the free space;

identifying one or more types of a set of unprocessed I/O requests, acquiring a set of arrival times associated with the set of unprocessed I/O requests, and adjusting an order of the set of unprocessed I/O requests based on the set of arrival times and the maximum scheduling delay time; and processing the set of unprocessed I/O requests according to the order of the set of unprocessed I/O requests.

12. The method of claim 11, wherein the set of unprocessed I/O request comprises at least one of a read I/O request, a write I/O request, or the erase I/O request.

13. The method of claim 12, wherein identifying the one or more types of the set of unprocessed I/O requests, acquiring the set of arrival times associated with the set of unprocessed I/O requests, and adjusting the order of the set of unprocessed I/O requests based on the set of arrival times and the maximum scheduling delay time further comprises:

obtaining at least one arrival time of at least one of the read I/O request, the write I/O request, or the erase I/O request; and adjusting an order of the at least one of the read I/O request, the write I/O request, or the erase I/O request according to the at least one arrival time and the maximum scheduling delay time.

* * * * *